(12) United States Patent
Kurashige

(10) Patent No.: US 8,073,748 B2
(45) Date of Patent: Dec. 6, 2011

(54) INVENTORY MANAGEMENT METHOD AND PROGRAM PRODUCT

(75) Inventor: Yuuko Kurashige, Yakohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/779,450

(22) Filed: May 13, 2010

(65) Prior Publication Data

US 2010/0287074 A1 Nov. 11, 2010

Related U.S. Application Data

(62) Division of application No. 10/890,858, filed on Jul. 13, 2004, now Pat. No. 7,720,724.

(30) Foreign Application Priority Data

Jul. 17, 2003 (JP) .................................. 2003-276031

(51) Int. Cl.
*G06Q 10/00* (2006.01)

(52) U.S. Cl. .......................... 705/28; 705/7.11; 705/7.12

(58) Field of Classification Search ........................ None
See application file for complete search history.

(56) References Cited

U.S. PATENT DOCUMENTS

| 2003/0050901 A1 | 3/2003 | Jester et al. |
| 2003/0126072 A1* | 7/2003 | Brock .............................. 705/38 |
| 2004/0117293 A1 | 6/2004 | Lammle et al. |

FOREIGN PATENT DOCUMENTS

| JP | PUPA 05-120313 | 10/1991 |
| JP | PUPA 2001-005863 | 1/2001 |
| JP | PUPA 2002-024655 | 1/2002 |
| JP | PUPA 2002-203138 | 7/2002 |
| JP | PUPA 2002-362743 | 12/2002 |
| JP | PUPA 2003-137435 | 5/2003 |
| JP | PUPA 2003-196527 | 11/2003 |
| JP | PUPA 2004-078469 | 11/2004 |

* cited by examiner

*Primary Examiner* — Faris Almatrahi

(74) *Attorney, Agent, or Firm* — Scully, Scott, Murphy & Presser, P.C.; William H. Steinberg, Esq.

(57) ABSTRACT

A management server for managing inventory of articles and a terminal device for inquiring the condition of inventory are provided. The management server is provided with an inventory database and a database control portion for controlling input and output of data to and from the inventory database. The inventory database stores, as management information, information identifying articles and salespersons responsible for the articles as well as, for articles specified to be included in open inventory, information indicating that persons other than the salespersons responsible for the articles are permitted to sell the particular article. Furthermore, the management server accepts access by particular users from the terminal device to the management information on the articles included in ordinary inventory and also accepts access by users other than the particular users from the terminal device to the management information on the articles included in open inventory.

2 Claims, 10 Drawing Sheets

| | | |
|---|---|---|
| ITEM 1 | KEY 1 | SLIP NUMBER | 23456 |
| ITEM 2 | KEY 2 | SUPPLIER CODE | 7777 |
| ITEM 3 | KEY 3 | ARTICLE CODE | 100000 |
| ITEM 4 | | SELLING UNIT PRICE | 800 |
| ITEM 5 | | QUANTITY | 10 |
| ITEM 6 | | WAREHOUSE CODE | 01 |
| ITEM 7 | | DEPARTMENT CODE | 30 | DEPARTMENT CODE OF SALESPERSON A |
| ITEM 8 | | SECTION CODE | 10 | SECTION CODE OF SALESPERSON A |
| ITEM 9 | | SALESPERSON CODE | 2211 | SALESPERSON CODE OF SALESPERSON A |

FIG. 3

| | | | |
|---|---|---|---|
| ITEM 1 | KEY 1 | WAREHOUSE CODE | 01 | WAREHOUSE CODE OF WAREHOUSE IN WHICH THE ARTICLE IS STOCKED |
| ITEM 2 | KEY 2 | DEPARTMENT CODE | 30 | DEPARTMENT CODE OF SALESPERSON A |
| ITEM 3 | KEY 3 | SECTION CODE | 10 | SECTION CODE OF SALESPERSON A |
| ITEM 4 | KEY 4 | ARTICLE CODE | 100000 | ARTICLE CODE OF ARTICLE PURCHASED |
| ITEM 5 | KEY 5 | CUSTOMER CODE | 1234 | FOR WHICH CUSTOMER THE ARTICLE HAS BEEN PURCHASED |
| ITEM 6 | | INVENTORY UNIT COST | 800 | PURCHASE COST |
| ITEM 7 | | LOWER-LIMIT INVENTORY UNIT COST | | |

FIG. 4

| ITEM 1 | KEY 1 | WAREHOUSE CODE | 01 |
| ITEM 2 | KEY 2 | DEPARTMENT CODE | 30 |
| ITEM 3 | KEY 3 | SECTION CODE | 10 |
| ITEM 4 | KEY 4 | ARTICLE CODE | 100000 |
| ITEM 5 | KEY 5 | CUSTOMER CODE | 1234 |
| ITEM 6 | | INVENTORY UNIT COST | 900 |
| ITEM 7 | | LOWER-LIMIT INVENTORY UNIT COST | 810 |

AUTOMATIC CALCULATION: PURCHASE COST + WAREHOUSE STORAGE CHARGES

UPDATE

FIG. 5

| ITEM 1 | KEY 1 | WAREHOUSE CODE | 99 | OPEN WAREHOUSE CODE |
| --- | --- | --- | --- | --- |
| ITEM 2 | KEY 2 | DEPARTMENT CODE | 30 | |
| ITEM 3 | KEY 3 | SECTION CODE | 10 | |
| ITEM 4 | KEY 4 | ARTICLE CODE | 100000 | |
| ITEM 5 | KEY 5 | CUSTOMER CODE | 9999 | UNSPECIFIED CUSTOMER IS AUTOMATICALLY INPUTTED |
| ITEM 6 | | INVENTORY UNIT COST | 900 | |
| ITEM 7 | | LOWER-LIMIT INVENTORY UNIT COST | 810 | |

FIG. 6

| ITEM 1 | KEY 1 | SLIP NUMBER | 12345 |
| --- | --- | --- | --- |
| ITEM 2 | KEY 2 | CUSTOMER CODE | 8888 |
| ITEM 3 | KEY 3 | ARTICLE CODE | 100000 |
| ITEM 4 | | SELLING UNIT PRICE | 820 |
| ITEM 5 | | QUANTITY | 10 |
| ITEM 6 | | PROFIT | 100 |
| ITEM 7 | | DEPARTMENT CODE | 20 |
| ITEM 8 | | SECTION CODE | 10 |
| ITEM 9 | | SALESPERSON CODE | 2010 |

- (820-810)×10
- DEPARTMENT CODE OF SALESPERSON B
- SECTION CODE OF SALESPERSON B
- SALESPERSON CODE OF SALESPERSON B

FIG. 7

INVENTORY MANAGEMENT METHOD AND PROGRAM PRODUCT

RELATED APPLICATIONS

This application is a divisional of U.S. application Ser. No. 10/890,858, filed Jul. 13, 2004.

FIELD OF THE INVENTION

The present invention relates to a system for managing inventory of articles using a computer and a method for the management thereof.

BACKGROUND OF THE INVENTION

In a distribution process for articles, there are wholesalers and sellers operating between shipment of articles and delivery of the articles to consumers, and each of the wholesalers and sellers has inventory. When stock of inventory is held for a long time, it causes not only a delay in earning a profit but also increases inventory unit cost due to additional expenses such as warehouse storage charges, and as a result, profit may be reduced even if articles in stock are sold, and furthermore, even a loss may be caused. Accordingly, in order to realize efficient distribution of articles, it is desirable to prevent having stock at more than a necessary level, and therefore it is important to perform appropriate inventory management. Today, there are widespread inventory management systems using a computer, which contribute to improvement in the working efficiency for inventory management (for example, see the abstract of Japanese Published Unexamined Patent Application No. 5-120313).

At wholesalers and sellers, inventory management is generally performed by each department or each salesperson. Therefore, even articles stocked for a long time are generally handled (sold, disposed of or continuously managed as inventory) by the responsible department or salesperson.

OBJECTS OF THE INVENTION

As described above, since inventory management of articles is performed by each department or each salesperson, even articles stocked for a long time are generally handled by the responsible department or salesperson.

Articles with the inventory unit cost increased by added costs due to prolonged inventory are difficult to sell in comparison to other articles. One may want to avoid selling such articles or even wish to dispose of them, from the viewpoint of a profit target of each department or salesperson. However, from the view point of a company, it is desirable to sell such articles rather than disposing of them, in order to contribute to sales.

To cope with this problem, it is conceivable that articles which have been stocked for a long time can be sold by other departments having a demand for those articles. This enables the company to increase profit due to sale of the articles. The original department and salesperson that placed the articles in stock can clear off the articles having an increased unit cost, from their inventory.

However, if inventory management is performed by each department or each salesperson as described above, it is difficult for other departments or salespersons to recognize which department or salesperson has a long-term inventory stock. It is also difficult for the department or salesperson that has the long-term inventory stock to determine which department or salesperson has a demand for the article.

Accordingly, the object of the present invention is to provide a system enabling inventory to be efficiently handled by exchanging information among departments and a method for the management thereof.

SUMMARY OF THE INVENTION

In order to achieve the above object, the present invention is realized as an inventory management system comprising: a management server for managing inventory of articles; and a terminal device for accessing the management server to inquire into the status of inventory. In this inventory management system, the management server accepts access by particular users, from the terminal device to management information on articles included in ordinary inventory and also accepts access by users other than the particular users, from the terminal device to management information on articles specified to be included in open inventory.

In this case, in response to the status that an article specified to be included in the open inventory is sold, the management server calculates profit obtained by a seller of the article based on a predetermined condition included in the management information on the article. The management server retains, as information used for calculating the profit, the lower-limit value for the selling price of the article or profitability indicated by the rate of profit to be obtained when a seller sells the article relative to the selling price of the article.

The management server is configured to comprise: an inventory data base storing management information on inventory of articles; and a database control portion for controlling input and output of data to and from the inventory data base. The inventory database stores, as the management information, information identifying the articles and salespersons responsible for the articles as well as, for a particular article, information indicating that persons other than the salesperson responsible for the particular article are permitted to sell the particular articles.

As a specific approach, in this management server, the inventory database may be configured to store warehouse codes indicating warehouses in which articles are stocked and customer codes identifying customers to whom the articles are sold; and the database control portion may be configured to replace the warehouse code associated with an article which persons other than a salesperson responsible for the article are permitted to sell, with a specially defined code and replace the customer code associated with the article with a code indicating that sale of the article is not limited to specified customers.

Furthermore, in this management server, as for the article which persons other than the responsible salespersons are permitted to sell, the inventory database stores the lower-limit value for the selling price of the article or profitability indicated by the rate of profit to be obtained when a seller sells the article relative to the selling price of the article; and in response to the status that the article is sold, the database control portion calculates profit obtained by selling the article based on the lower-limit value for the selling price or the profitability.

Another embodiment of the present invention that achieves the above object is realized as the following inventory management method for using a computer to perform inventory management of articles. The inventory management method comprises: storing management information on inventory of articles, including information identifying articles and salespersons responsible for the articles in a predetermined storage device; accepting an operation of specifying a particular article is to be included in open inventory; and, for the article specified to be included in the open inventory, permitting persons other than a salesperson responsible for the article to sell the article by storing information indicating that the article is included in the open inventory, in the storage device as the management information.

Furthermore, the present invention is also realized as a program product for controlling a computer to function as the management server described above or a program product for causing a computer to execute a process corresponding to each step in the inventory management method described above. The program product can be provided by storing it in a magnetic disk, optical disk, semi-conductor memory or other recording media and distributing the recording medium, or by delivering the program product via a network.

Furthermore, the present invention is also realized as a recording medium storing management information on inventory of articles, including information identifying the articles and salespersons responsible for the articles and, for an article specified to be included in open inventory among the inventory of articles, information indicating that persons other than a salesperson responsible for the article are permitted to sell the article, in a manner that the information can be read by a computer.

BRIEF DESCRIPTION OF THE DRAWINGS

FIG. 3 shows an example of configuration of information to be registered with a purchase DB;

FIG. 4 shows an example of configuration of information to be registered with an inventory DB;

FIG. 5 shows an example of configuration of information to be registered with an inventory DB and shows that an inventory unit cost obtained by addition and subtraction is set;

FIG. 6 shows an example of configuration of information to be registered with an inventory DB and shows that a warehouse code and a customer code have been changed;

FIG. 7 shows an example of configuration of info nation to be registered with a sales DB;

PREFERRED EMBODIMENT OF THE INVENTION

Description will be made of a preferred embodiment for implementing the present invention (hereinafter, referred to as an embodiment) in detail below with reference to the accompanying drawings.

Figure 1:
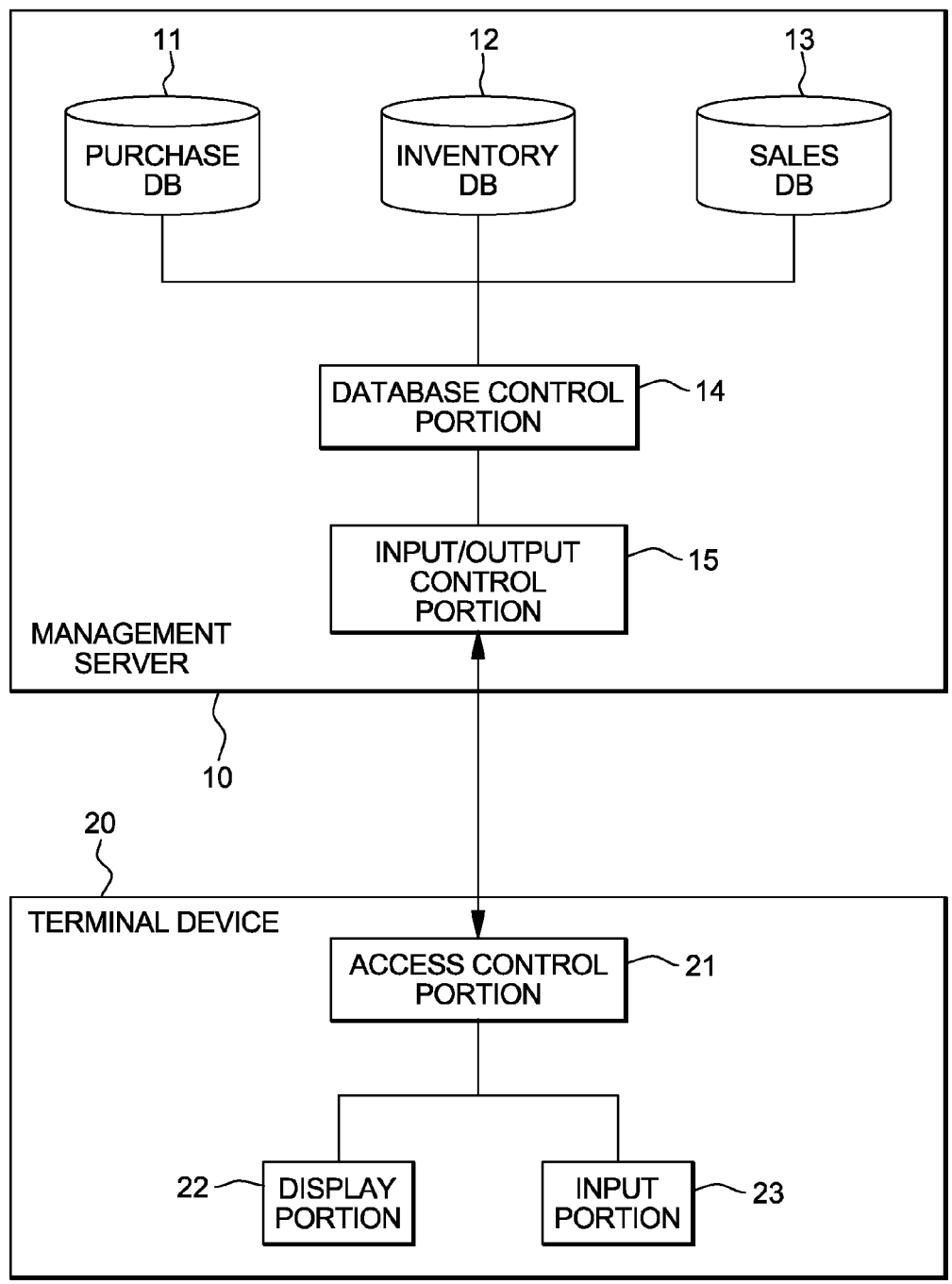
FIG. 1 shows the entire configuration of an inventory management system according to this embodiment.

FIG. 1 shows the entire configuration of an inventory management system according to this embodiment.

As illustrated, this embodiment comprises a management server 10 for managing inventory of articles and a terminal device 20 for accessing the management server 10 via an intra-company LAN or other networks to communicate information.

The management server 10 constituting the inventory management system according to this embodiment is realized with a workstation, a personal computer or other computers, for example. The terminal device 20 is realized with a computer, such as a personal computer, or an information terminal provided with a network function, such as a PDA (personal digital assistant) and a mobile telephone.

Figure 2:
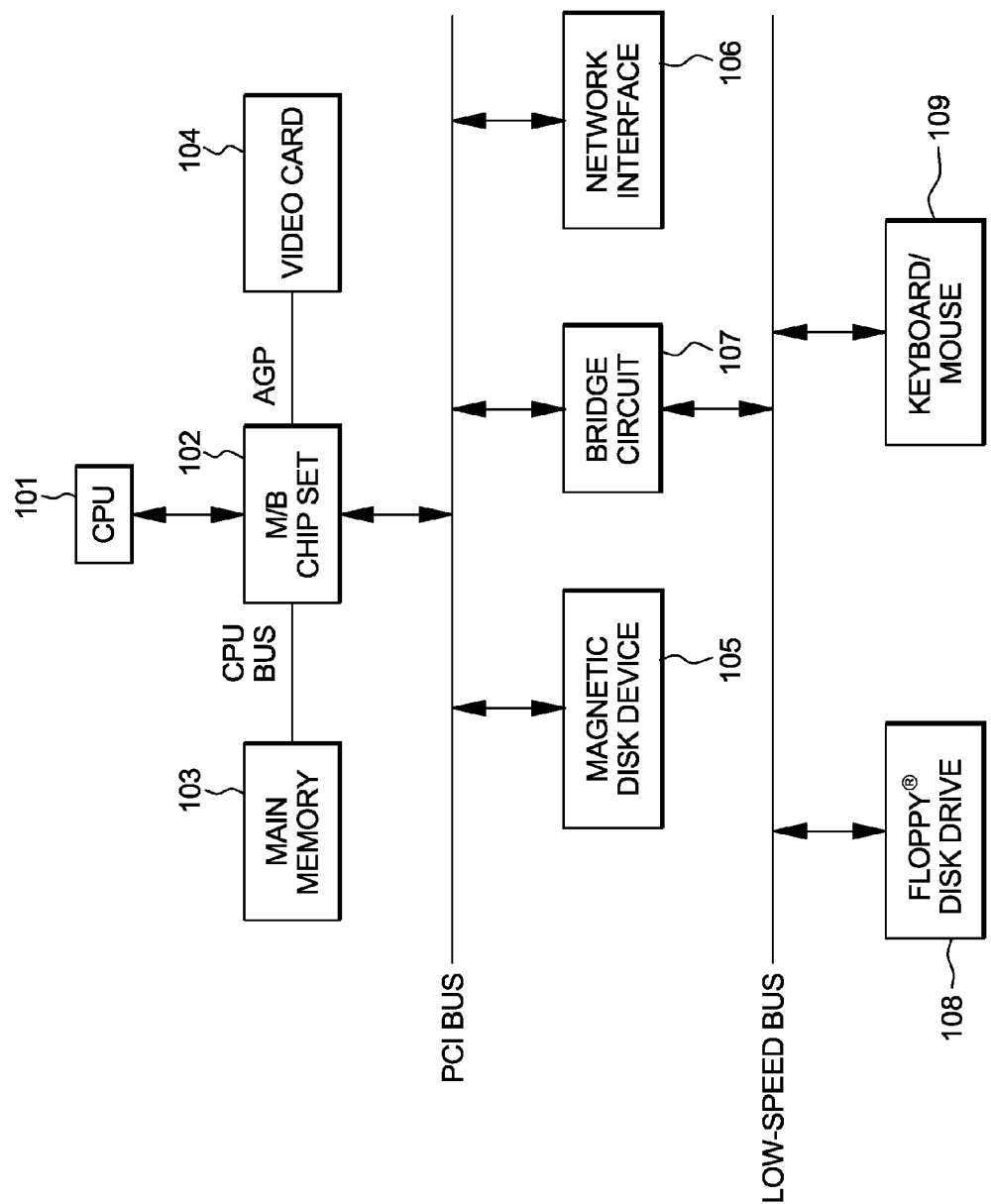
FIG. 2 schematically shows an example of a hardware configuration of a computer that is preferable for realizing a management server and a terminal device constituting this embodiment.

FIG. 2 schematically shows an example of a hardware configuration of a computer that is preferable for realizing the management server 10 and the terminal device 20 constituting this embodiment.

The computer shown in FIG. 2 comprises a CPU (central processing unit) 101, which is operation means, a M/B (mother board) chip set 102, a main memory 103 connected to the CPU 101 via a CPU bus, a video card 104 similarly connected to the CPU 101 via the M/B chip set 102 and an AGP (accelerated graphics port), a magnetic disk device (HDD) 105 connected to the M/B chip set 102 via a PCI (peripheral component interconnect) bus, a network interface 106, and a floppy disk drive 108 and a keyboard/mouse 109 connected to the M/B chip set 102 via the PCI bus, a bridge circuit 107 and a low-speed bus such as an ISA (industry standard architecture) bus.

FIG. 2 only shows an example of a hardware configuration of a computer realizing this embodiment, and other various configurations are possible only if this embodiment is applicable. For example, a configuration may be possible in which only a video memory is mounted, instead of providing a video card 104, to have image data processed by the CPU 101. Alternatively, a drive for CD-R (compact disc recordable) or DVD-RAM (digital versatile disc random access memory) may be provided via an interface such as an ATA (AT attachment) or a SCSI (small computer system interface) as an external storage device.

Referring to FIG. 1, the management server 10 used for this embodiment is provided, in its functional configuration, with three kinds of databases, that is, a purchase DB (database) 11, an inventory DB 12, and a sales DB 13, a database control portion 14 for reading and updating the contents of the databases, and an input/output control portion 15 for outputting the contents of the databases and accepting particular input.

Among these components of the management server 10, each of the databases is realized with a magnetic disk device 105 shown in FIG. 2, for example. The database control portion 14 is realized with the program-controlled CPU 101. The input/output control portion 15 is realized with the program-controlled CPU 101 and a network interface 106. The program product for controlling the CPU 101 can be provided by storing it in a magnetic disk, optical disk, semi-conductor memory or other recording media and distributing the recording medium or by delivering it via a network.

In the above configuration, the purchase DB 11 is a database used for purchase of articles by departments or salespersons. FIG. 3 shows an example of configuration of information to be registered with the purchase DB 11. In the example shown in FIG. 3, the following information is registered with the purchased DB 11 for an article to be purchased: "slip number", "supplier code" indicating a supplier of the article, "article code" indicating the kind of the article, "selling unit price", "quantity", "warehouse code" indicating a warehouse storing the article, and "department code", "section code" and "salesperson code" indicating the department, section and salesperson responsible for the article. The "slip number", "supplier code" and "article code" are key items (keys 1 to 3) of the purchase DB 11, and each data is identified with these items.

The inventory DB 12 is a database used for management of inventory of articles. FIGS. 4 to 6 show an example of configuration of information to be registered with the inventory DB 12. In the examples shown in FIGS. 4 to 6, the following information is registered with the inventory DB 12 for each of stocked articles: "warehouse code" indicating a warehouse storing the article, "department code" and "section code" indicating the department and section responsible for the article, "article code" indicating the kind of the article, "customer code" indicating an customer to which the article is scheduled to be sold, "inventory unit cost" and "the lower-limit inventory unit cost". The lower-limit inventory unit cost here is the lower-limit value for a unit price to be given to the article in response to that the article is moved into open inventory, which will be described later. The "warehouse code", "department code", "section code", "article code" and "customer code" are key items (keys 1 to 5) of the inventory DB 12, and each data is identified with these items.

The sales DB 13 is a database used for management of information on articles which have been sold. FIG. 7 shows an example of configuration of information registered with the sales DB 13. In the example shown in FIG. 7, the following information is registered with the sales DB 13 for an article which has been sold: "slip number", "customer code" indicating the customer of the article, "article code" indicating the kind of the article, "selling unit price", "quantity", "profit" indicating profit obtained by selling the article, and "department code", "section code" and "salesperson code" indicating the department, section and salesperson that has sold the article. The "slip number", "customer code" and "article code" are key items (keys 1 to 3) of the sales DB 13, and each data is identified with these items.

The database control portion 14 reads and updates data of each of the databases in response to a request by a user. It also controls access to each database by the user. Furthermore, it performs calculation of profit in response to input of sales to the sales DB 13 (these processes are to be described later in detail).

The input/output control portion 15 accesses terminal device 20 with its network function to receive a request for reading from or update of the database by the user and send it to the database control portion 14, and returns data read by the database control portion 14 to the terminal device 20.

In this case the user is a salesperson or a person responsible for purchase who operates the terminal device 20 to access the database of the management server 10 and refer to or input data.

In this embodiment, a condition called "open inventory" is defined as an inventory condition or status of an article managed by the inventory DB 12. The open inventory is a state of an inventory article which has been free from management by the department or salesperson that purchased the article and permitted to be sold by other departments or salespersons. To describe this from the viewpoint of inventory management by the management server 10, while management information on normal inventory can be accessed and viewed only by the salesperson and the department concerned in the inventory article, the management information on the inventory article can be viewed by salespersons of other departments once the inventory article is moved into the open inventory. Such access control for management information is performed by the database control portion 14.

In this embodiment, in order to realize this open inventory, an open warehouse code for managing the open inventory is set and the lower-limit unit cost is provided as an item to be registered with the inventory DB 12.

Description will be made of the open inventory in more detail with reference to FIGS. 4 to 8.

Figure 8:
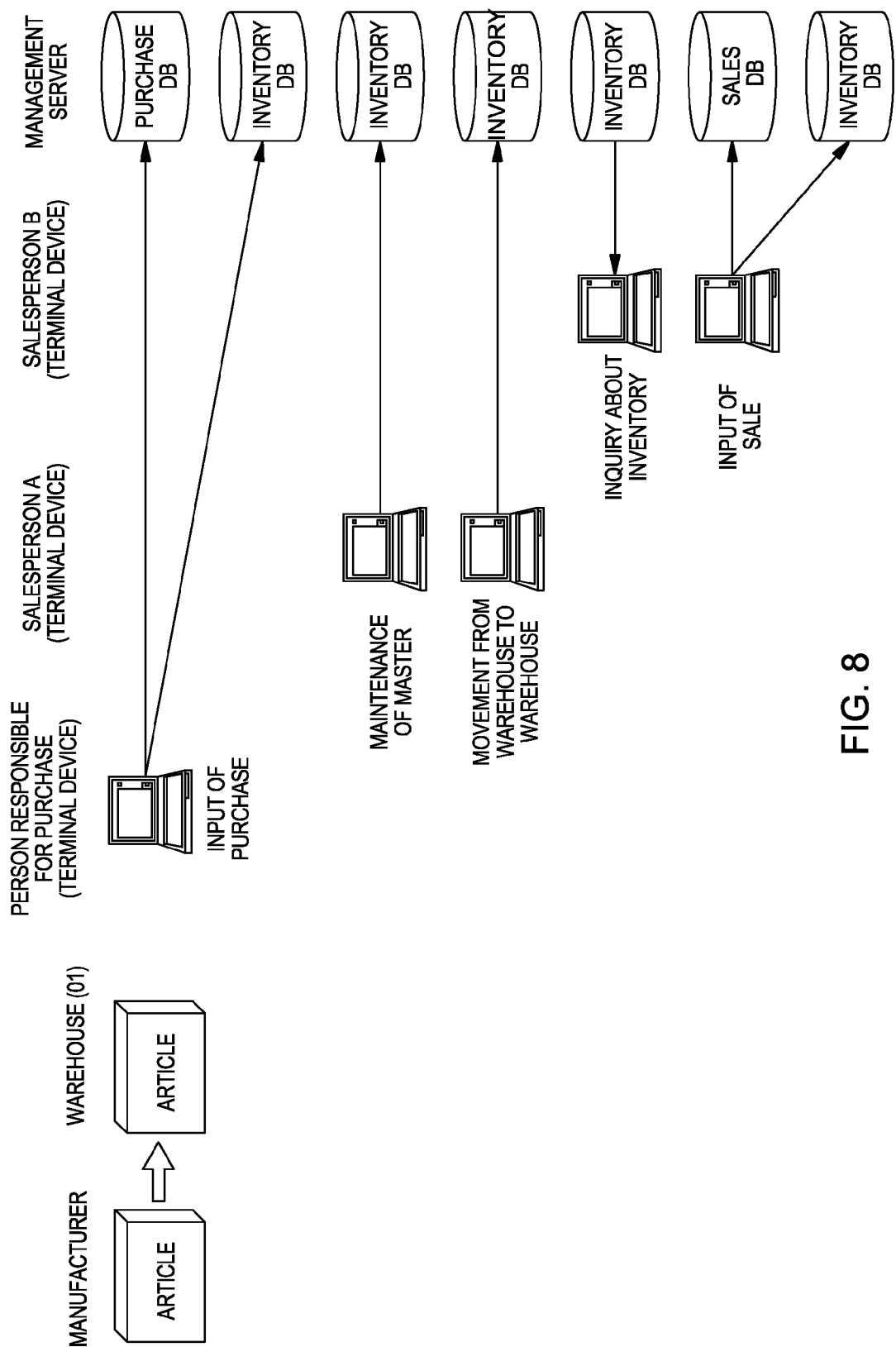
FIG. 8 illustrates a process of inventory management from purchase of an article to sale of the article.

FIG. 8 illustrates a process of inventory management from purchase of an article to sale of the article.

It is assumed here that a particular article is purchased in response to a request by a salesperson A (person responsible for sales; department code 30; section code 10; and salesperson code 2211) and included in inventory. When the article is carried in a warehouse from a manufacturer, a person responsible for purchase performs a purchase input process to input data for the article into the purchase DB 11 and the inventory DB 12. FIG. 4 shows the condition of the article. It is seen from FIG. 4 that the article is purchased at an inventory unit cost (purchase cost) ¥800 for a customer with a customer code 1234. The article is stocked in a warehouse with a warehouse code 01.

If the article is stocked as inventory for a long time, expenses such as warehouse charges are added and the inventory unit cost increases. Then, from the viewpoint of a profit target of the salesperson A, it is difficult for the salesperson A himself to sell the article the inventory unit cost of which has increased. Therefore, he determines to have the article sold by a salesperson in demand for the article by moving the article into the open inventory.

In order to move the article into the open inventory, the salesperson A first performs maintenance for the master of the inventory DB 12 to set the lower-limit inventory unit cost for the article. The lower-limit inventory unit cost is determined in consideration of the company profit due to sales of the article and the profit of the salesperson A himself. FIG. 5 shows the condition of the article. It is seen from FIG. 5 that the inventory unit cost has increased from ¥800 to ¥900 compared to the registered contents in FIG. 4. The cost of ¥810 is given to the article as the lower-limit inventory unit cost. This means that ¥810 is determined as the lowest price that is not below the purchase cost.

The salesperson A then performs an inventory movement process to change the warehouse code of the warehouse in which the article is stocked. In response to this, the customer code is also changed to a code indicating an unspecified customer and releases restriction on customers. FIG. 6 shows the condition of the article then. It is seen from FIG. 6 that the warehouse code has been changed from 01 to 99 indicating an open warehouse, and the customer code has been changed from 1234 to 9999, which indicates an unspecified customer.

In this way, the article is moved into the open inventory. Inventory information on the article moved into the open inventory can be viewed and sold by other departments and salespersons. The inventory movement process is a process for changing the management condition of the inventory article on a database and it is not necessary to actually move the inventory article to an actual warehouse defined as an open warehouse.

Now, suppose that the article moved into the open inventory is sold by a salesperson B (department code 20; section code 10; and salesperson code 2010) belonging to a department different from the one that salesperson A belongs to. In this case, salesperson B first inquires inventory and views the management information on the article moved into the open inventory, determines that the article can be sold at a price equal to or above the lower-limit inventory unit cost, and then sells it. Salesperson B performs a sales input process to input data related to the sale of the article into the inventory DB 12 and the sales DB 13. FIG. 7 shows the condition of the sale of the article at the time. It is seen from FIG. 7 that ten (10) of the article have been sold to a customer with a customer code 8888 at a selling price of ¥820.

When the sales input process is performed, the database control portion 14 calculates profit obtained by selling the article (profit calculation process) and registers it with an appropriate entry of the sales DB 13. In the example in FIG.

7, since the article, for which the lower-limit unit cost is set as ¥810, has been sold at ¥820, the selling profit for each article is ¥10 (=820−810). Since the quantity is 10, the total profit is calculated to be ¥100 (10¥10).

As a result of the above operation, the article, the inventory unit cost of which increased to ¥900 due to addition of expenses, has been sold at ¥820, and therefore the salesperson A made results of −¥800 (=(820−900) ¥10 units). Since the salesperson B has sold the article, the lower-limit inventory unit cost of which is ¥810, at a price of ¥820 and therefore made results of ¥100 (=(820−810) ¥10 units). In this case, the results of the salesperson A is a loss of ¥800. However, the loss is reduced in comparison to the case where the article should be disposed of because it cannot be sold after a long-term inventory (in this case, the loss would be ¥9000 (=900 ¥10 units)).

In the above example, the profit due to the sales of the article included in the open inventory is calculated as difference between the lower-limit inventory unit cost and the selling unit price. However, it is also possible to set, when moving an inventory article to the open inventory, profitability of a salesperson who has sold the article rather than setting the lower-limit inventory unit cost of the article.

For example, suppose that profitability of 0.1 is set instead of the lower-limit inventory unit cost in the example in FIG. 6. In this case, a salesperson who has sold the article sets a tenth of the selling price as his results. Accordingly, if salesperson B has sold ten (10) of the open inventory article at ¥800, it means that he has made results of ¥800 (=800 ¥0.1 ¥10 units). As for the salesperson A, since the article, the inventory unit cost of which is ¥900, has been sold at ¥800, he has made results of −¥1000 (=(800−900) ¥10 units).

It is optional whether the lower-limit inventory unit cost or profitability is used and any value can be used as the lower-limit inventory unit cost and profitability, for calculation of profit due to sales of an open inventory article. These can be determined by a salesperson responsible for the inventory (salesperson A in this case) or the department he belongs to.

The function of terminal device 20 comprising the inventory management system according to this embodiment will now be described.

Referring to FIG. 1, terminal device 20 used for this embodiment comprises an access control portion 21 for accessing the management server 10 via a network, a display portion 22 for displaying and outputting information acquired from the management server 10 to present it to a user, and an input portion 23 for accepting input of a command or data by the user.

Among the components of terminal device 20, the access control portion 21 is realized with network interface 106 and the program-controlled CPU 101 shown in FIG. 2, for example. The display portion 22 is realized with the program-controlled CPU 101, the video card 104 and a display device (such as a liquid crystal display) not shown. The input portion 23 is realized with an input device such as the keyboard/mouse 109 or other pointing devices. The program product for controlling the CPU 101 can be provided by storing it on a magnetic disk, optical disk, semi-conductor memory or other recording media and distributing the recording medium or by delivering it via a network.

In the above configuration, access control portion 21 accesses the management server 10 with its network function to acquire information on a particular article stored in the purchase DB 11, the inventory DB 12 or the sales DB 13 or to send data to be recorded to these databases.

The display portion 22 displays the information on a particular article acquired from the management server 10, on the display device in a format such as a list. The user can refer to the information displayed on the display device to recognize the condition of purchase, inventory, sales of the article, or refer to the information read from the inventory DB 12 to inquire the open inventory.

The input portion 23 accepts input of a command or data to be sent to the management server 10 by the user. By referring to the information displayed on the display portion 22, the user can input data for an article into each database or perform an operation for moving a particular article managed in the inventory DB 12 into open inventory.

The operation for accessing the management server 10 with the terminal device 20 to move an inventory article into the open inventory and the operation for selling an article in the open inventory to be performed by a user (salesperson) will now be described.

Figure 9:
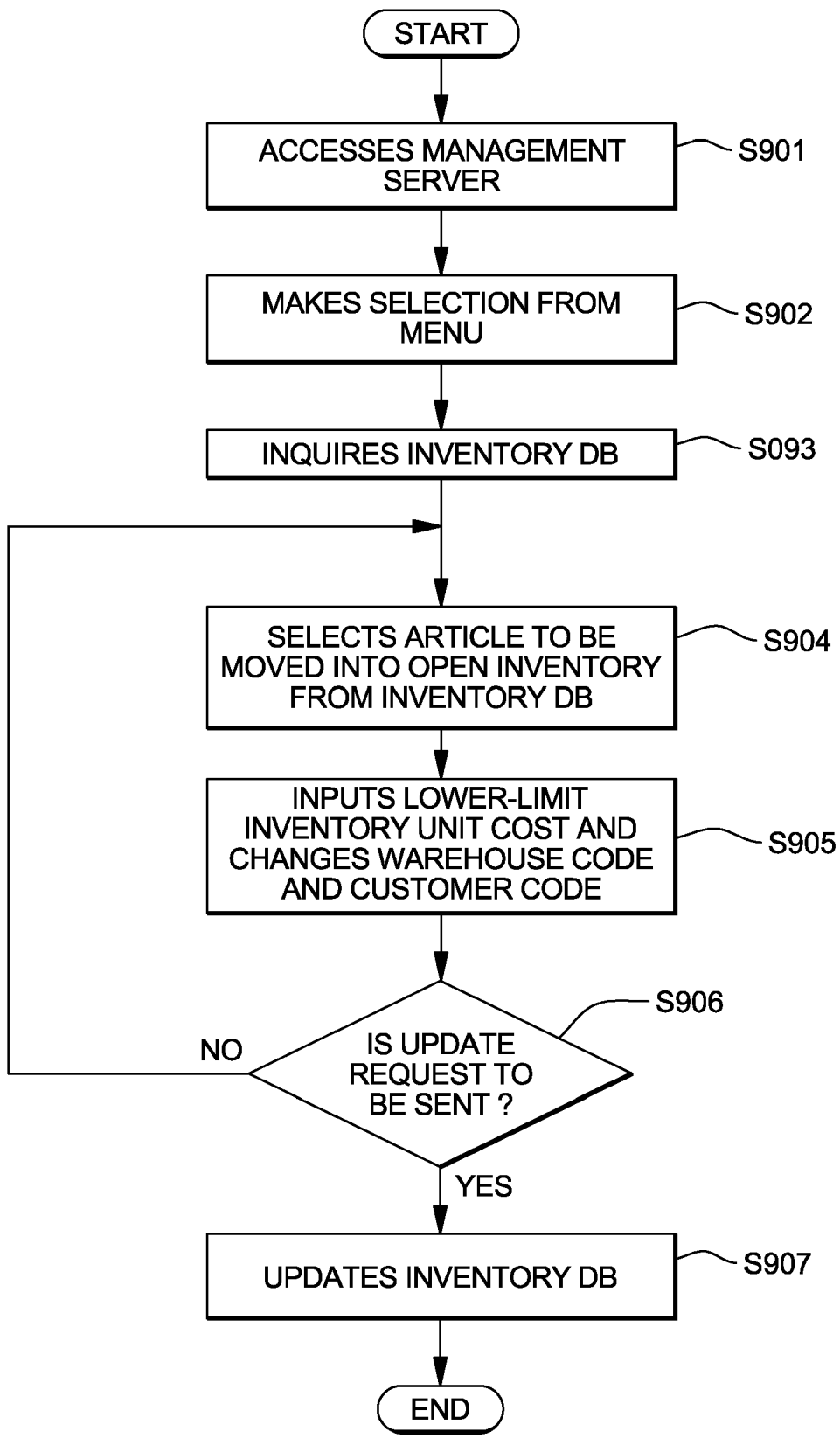
FIG. 9 is a flowchart showing an operation performed when an inventory article is moved into open inventory.
Figure 10:
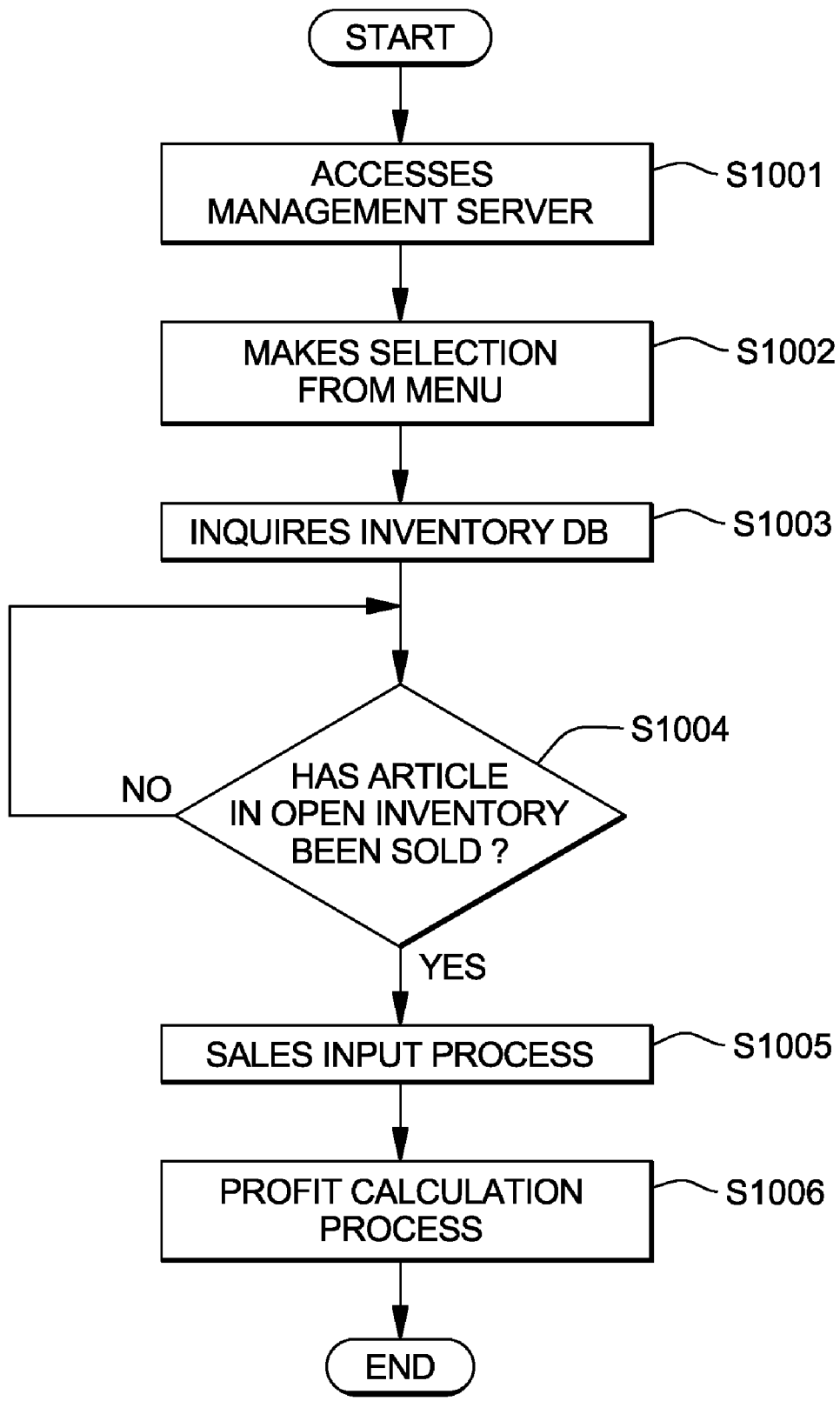
FIG. 10 is a flowchart showing an operation performed when selling an article in open inventory.

FIG. 9 is a flowchart showing the operation performed when an inventory article is moved into the open inventory, and FIG. 10 is a flowchart showing the operation performed when selling an article in the open inventory.

Referring to FIG. 9, a user (corresponding to the salesperson A in FIG. 8) operates the terminal device 20 to access the management server 10 (step 901), makes selection from the menu (step 902), and inquires management information on articles managed by the user himself or the department he belongs to, from the inventory DB 12 (step 903).

Referring to the management information on the articles displayed on the display portion 22 of the terminal device 20, the user selects an article to be moved into the open inventory on the screen (step 904). The article to be moved into the open inventory is an article which has been stocked in inventory for a long time and therefore he has determined to have other departments sell, as described above. When the article to be moved into the open inventory is determined, the user operates the input portion 23 to input the lower-limit inventory unit cost and change the warehouse code and the customer code (step 905). Then, the user sends a request for updating the inventory DB 12, including the inputted contents (step 906), and causes the management server 10 to update the inventory DB 12 (step 907). Thereby, the movement of the article into the open inventory is reflected to the inventory DB 12 of the management server 10.

The operation for sale of an article in the open inventory will now be described.

Referring to FIG. 10, a user (corresponding to salesperson B in FIG. 8), operates the terminal device 20 to access the management server 10 (step 1001), makes selection from the menu (step 1002), and inquires management information on the open inventory from the inventory DB 12 (step 1003). Thereby, the user can determine whether to take over sale of a particular article in the open inventory.

When a particular article in the open inventory has been sold, the user operates the terminal device 20 to input information on sales of the article, accesses the management server 10 to send the information on sales and thereby causes the information to be inputted into the sales DB 13 (steps 1004 and 1005). In response to this, the management server 10 calculates profit, and the profit is registered with an appropriate entry in the sales DB 13 (step 1006).

A preferred embodiment for implementing the present invention has been described. However, it goes without saying that the present invention is not limited to the embodiment described above. For example, contents to be registered with the purchase DB 11, the inventory DB 12 and the sales DB 13 can be arbitrarily defined depending on the actual operation of inventory management, in addition to the items described above. The department code, the section code, the salesperson code and the like may be arbitrarily arranged based on the organization structure of each wholesaler or seller. The configuration of the management server 10 is also not limited to that shown in FIG. 1, and each database may be managed by a separate server. Furthermore, the method for calculating profit in the sales DB 13 is also not limited to the approach using an inventory unit cost obtained by lower-limit or profitability described above.

There are various conceivable methods for determining which salesperson is to take over sale of an article in the open inventory when there are multiple salespersons who can takeover sale of the article. For example, a salesperson who offered the highest price may take over sale of the article just like an auction. Alternatively, a salesperson who made an offer for sale of the article earliest may take over sale of the article.

What is claimed is:

1. An inventory management system, comprising:
   a memory storage device;
   a management server for managing inventory of articles, said management server including a processor device in communication with the memory storage device, wherein the processor device is capable of performing a method for managing inventories of articles for an organization, said method comprising:
   storing management information on a first inventory of articles in said memory storage device, said information including information identifying articles and first salespersons of a department within the organization designated to sell each respective article in said memory storage device;
   moving an article from the first inventory of articles to a second inventory of articles, where the second inventory of articles allows second salespersons of other departments within the organization who have not purchased the article to sell articles included in the second inventory of articles; and
   for the article specified to be included in the second inventory, storing in the memory storage device, information accessible by said second salespersons indicating the article is included in the second inventory as the management information; and
   storing, for the article specified to be included in the second inventory, information of profitability indicated by a rate of profit to be obtained when a seller sells the article relative to the selling price of the article, and a lower-limit inventory unit cost value; and
   in response to a status that the article is sold, calculating a profit for said second salesperson obtained by selling the article based on the profitability, and calculating a profit for said first salesperson based on the lower-limit inventory unit cost value; and
   a terminal device providing said first and second salespersons access to the management server to inquire the condition of the first and second inventory,
   wherein the management server accepts access by said first salespersons from the terminal device to management information on articles included in said first inventory and also accepts access by said second salespersons from the terminal device to management information on articles specified to be included in said second inventory.

2. The inventory management system according to claim 1, wherein said calculating a profit comprises:
   calculating a profit of said second salespersons according to:
   (a selling price per unit×said profitability×the number of units sold), and
   calculating a profit of said first salespersons according to:
   (said selling price per unit−an inventory unit cost)×the number of units sold.

* * * * *